United States Patent
Herschler et al.

(10) Patent No.: US 6,212,272 B1
(45) Date of Patent: Apr. 3, 2001

(54) SUBSCRIBER LINE INTERFACE CIRCUIT (SLIC) SIMULATOR

(75) Inventors: Scott C. Herschler; Meir Dahan, both of Chicago; Leming Xu, Skokie, all of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/149,982

(22) Filed: Sep. 9, 1998

Related U.S. Application Data (62) Division of application No. 08/783,562, filed on Jan. 15, 1997, now abandoned.

(51) Int. Cl.[7] .................................................. H04M 3/02
(52) U.S. Cl. ........................ 379/399; 379/373; 370/264
(58) Field of Search ............................... 379/399, 29, 10, 379/56.2, 106.08, 398, 373, 418, 375, 283, 386, 252, 257, 350; 370/264, 359, 522; 341/110, 88, 89, 108

(56) References Cited

U.S. PATENT DOCUMENTS

| | | | |
|---|---|---|---|
| 4,258,928 | * 3/1981 | Lesea et al. | 379/214 |
| 4,803,437 | * 2/1989 | Reusens | 327/115 |
| 5,001,748 | * 3/1991 | Burns et al. | 379/418 |
| 5,459,788 | 10/1995 | Kim . | |
| 5,563,943 | 10/1996 | Takebayashi . | |
| 5,764,755 | * 6/1998 | Chen | 379/399 |
| 5,815,505 | * 9/1998 | Mills | 370/522 |
| 5,832,240 | * 11/1998 | Larsen et al. | 710/105 |

FOREIGN PATENT DOCUMENTS

WO 93/23809  11/1993 (EP) .

OTHER PUBLICATIONS

International Preliminary Examination Report for PCT Application Ser. No. PCT/US98/00713, Dated Apr. 13, 1999.

* cited by examiner

*Primary Examiner*—Wing F. Chan
(74) *Attorney, Agent, or Firm*—McDonnell Boehnen Hulbert & Berghoff (57) ABSTRACT

An analog subscriber unit adapter/interface which generates a low voltage ring-tone signal to an audio speaker is provided The adapter facilitates the use of an analog subscriber unit over an ISDN communications link and provides added functionality to ISDN devices. The SLIC simulator interface of the present invention is preferably provided as part of an ISDN modem, thereby giving added functionality to the modem by allowing analog phones to operate over an ISDN line. The interface operates by simulating the services and functions of an analog SLIC (Subscriber Line Interface Circuit) while converting and formatting the analog information to an ISDN compatible form, and vice versa. The SLIC simulator provides an audible ring-tone signal indicative of an incoming call by way of an audio speaker, thereby obviating the need for a high amplitude ring voltage signal to be sent to the subscriber unit. The need for a ring-trip circuit is therefore also obviated. The absence of a high amplitude ring voltage also permits circuit simplification and associated cost savings because the electrical isolation requirements recognized in the telecommunications industry are less strict for low-voltage circuits.

15 Claims, 4 Drawing Sheets

SUBSCRIBER LINE INTERFACE CIRCUIT (SLIC) SIMULATOR

This application is a division of U.S. patent application Ser. No. 08/783,562 filed Jan. 15, 1997 abandoned.

BACKGROUND OF THE INVENTION

The present invention relates generally to telecommunication systems and more particularly to an interface device for providing analog telephone functionality in connection with a digital telephone network.

In a traditional analog telephone system, each telephone or other communication device ("subscriber unit") is typically interconnected by a pair of wires ("tip" and "ring" wires or, cooperatively, "subscriber lines," "subscriber loop" or "phone lines") through a series of equipment to a switch at a local telephone company office ("central office"). At the central office, the tip and ring lines are interconnected to a device known as a "subscriber line interface circuit" or "SLIC," which provides required functionality to the subscriber unit. The switches at the central offices are interconnected to provide a network of switches thereby providing communications between, e.g., a local subscriber and a remote subscriber.

The SLIC is an essential part of the network's interface to individual analog subscriber units. The functions served by the SLIC include providing talking battery, ring voltage, ring trip, off-hook detection, and call progress signals such as ringback, busy, and dial tone. In many business office environments, the small-scale function of a central office is assumed by a PBX system, which, in turn, may include a number of SLICs to provide interconnected subscriber units with the required functionality.

Analog subscriber units generate and receive analog signals. While most modern telephone networks are digital and route digital signals from point to point, the subscriber units are still predominantly analog. This is possible because the analog signal generated by an analog subscriber unit is converted to digital form for transmission through the network, and is converted at the remote location back to analog form for transmission over the subscriber loop for reception by a remote analog subscriber unit. The analog signals generated and received by analog subscriber units generally take the form of voice frequency signals for end-to-end communications between local and remote subscriber units. Such signals generally represent human speech, or may be modulated signals which are treated by the phone network as if they were ordinary speech signals.

Other analog signals generated or received at the analog subscriber units are supervisory signals which are not intended for transmission to a remote terminal. Rather, they are designed to communicate with the network to enable functions such as call initiation, call progress indication, and call termination. These signals include those provided by, or through, a SLIC such as (i) "talk battery voltage" which provides power to the analog subscriber unit; (ii) "ring voltage" which is a relatively high voltage indicative of an incoming call, (iii) call progress tones such as dial tone, busy tone, and ringback tone. These various signals and tones will be described below.

The subscriber line interface circuit provides DC power, or "talk battery" power, along the phone lines to enable operation of circuitry in subscriber units connected to those lines. All telephone systems work on DC (direct current) power. Typically, the talking battery voltage on analog phone lines is between 5 (off-hook) and 48 volts (on-hook). Most telephone systems and PBXs are connected directly to an AC (alternating current) outlet on the wall and convert that AC power to the DC power required by the phone system. Telephone company central offices are also often driven by rechargeable lead acid batteries, which not only provide necessary power in the event of a power outage but also serve as a filter to smooth out fluctuations in the commercial power and remove the "noise" that power often carries. Talking battery must provide sufficient voltage to enable analog telephones to perform functions such as amplification and sound pickup as well as other modern phone functions such as DTMF keypads and speakerphone operation. The talking battery power supply should always be available to an analog telephone, in the event the phone is placed in an off-hook, or closed-circuit state.

A subscriber line interface circuit provides a ring voltage signal to the analog subscriber unit to cause the analog phone to ring in the event of an incoming telephone call. Analog phone systems recognize a ring voltage signal placed on the phone lines by the SLIC, and in turn generate an audible electronic or mechanical ring sound to alert the subscriber of an incoming call. In order to ensure that an analog phone will recognize the ring voltage signal, the ring voltage is required to be 70 to 90 volts (or 140 to 180 volts peak-to-peak AC) at a frequency of 17 to 20 Hz. Significantly, voltages of this magnitude may be harmful if accidentally applied to circuitry intended for operation at a lower voltage. Therefore, in the event of a malfunction, the SLIC is required to meet certain safety specifications and requirements relating to electrical isolation.

For example, European Standard EN 60950, entitled Particular Safety Requirements For Equipment To Be Connected To Telecommunication Networks, defines a hazardous voltage as a voltage exceeding 42.4 volts AC (peak) or 60 volts DC. Any components within a circuit that are connected to voltages above these limits must be electrically isolated (and in some cases, physically isolated) from the lower voltage components that are typically in connection with central office circuits. Components requiring isolation include the power supply and the tip and ring connections on the customer/subscriber side of the telephone network.

The power supply isolation requirement is typically satisfied by providing an additional secondary winding within the voltage transformer of the DC-to-DC converter which is used to generate the high amplitude ring voltage. The line isolation is typically satisfied by a line transformer. In general, however, these isolation requirements impose additional costs associated with the added componentry.

A SLIC also passes call progress tones such as dial tone, busy tone, and ringback tone to the subscriber unit For the convenience of the subscriber who is initiating the call, these tones are provided by the central office as an indication of call status. When the calling subscriber lifts the handset, or when the subscriber unit otherwise generates an "off hook" condition, the central office generates a dial tone and supplies it to the calling subscriber unit to indicate the availability of phone service. After the calling subscriber has dialed a phone number of the remote (answering) subscriber unit, the SLIC passes a ring back sound directed to the calling subscriber to indicate that the network is taking action to signal the remote subscriber, i.e., that the remote subscriber is being rung. Alteratively, if the network determines that the remote subscriber unit is engaged in another call (or is already off-hook), the network generates a busy tone directed to the calling subscriber unit.

The SLIC also acts to identify the status to, or interpret signals generated by, the analog subscriber unit. For example, the SLIC provides −48 volts on the ring line, and 0 volts on the tip line, to the subscriber unit. The analog subscriber unit provides an open circuit when in the on-hook condition. In a "loop start" circuit, the analog subscriber unit generates an off-hook condition by providing a termination, i.e., by closing, or "looping" the tip and ring to form a complete electrical circuit. This off-hook condition is detected by the SLIC (whereupon a dial tone is provided to the subscriber). Most residential circuits are configured as loop start circuits. Some countries, however, have other requirements. Germany, for example, requires a ground to be applied on an additional lead that acts as a control signal.

The SLIC must also be able to detect the off-hook condition during application of ring voltage. That is, when a call is incoming and the SLIC is providing the high amplitude ring voltage signal to the analog subscriber unit, the SLIC must be able to detect when the analog subscriber unit goes off-hook to answer the call. This is known as "ring trip." The SLIC must immediately cease the ring voltage signal upon detection of the off-hook condition, and provide the analog subscriber unit with the voice channel signals originating from the distant end subscriber unit.

The SLIC must also pass Dual Tone Multi-Frequency (DTMF) signals generated by the analog subscriber unit to the network. This signaling format is a well known method of providing dialing information. Each number on a keypad array is represented by two separate tones, one tone identifying the column, and the other representing the row. Together, two tones uniquely identify a digit. These tones are passed along to the network by the SLIC.

A digital transmission system such as integrated services digital network ("ISDN") provides digital information all the way to the subscriber unit. The central office uses special digital interface equipment on subscriber loops that provides ISDN services. The system also requires the presence of digital subscriber units to interpret this digital information. Although the central office equipment and the subscriber equipment is digital in nature, this digital information is typically transmitted along the same copper wires used by plain ordinary telephone service (POTS) from the central office to the customer premises. Basic ISDN service is known as 2B+D, for two Bearer (B) or subscriber channels, and one Data (D) channel for control and signaling data. The B channels are 64 K bits per second, and the D channel is typically 16 K bits per second. These data rates are significantly faster than rates of traditional analog modems that can provide data rates in the neighborhood of 28.8 K bits per second or 33.6 K bits per second.

Figure 1:
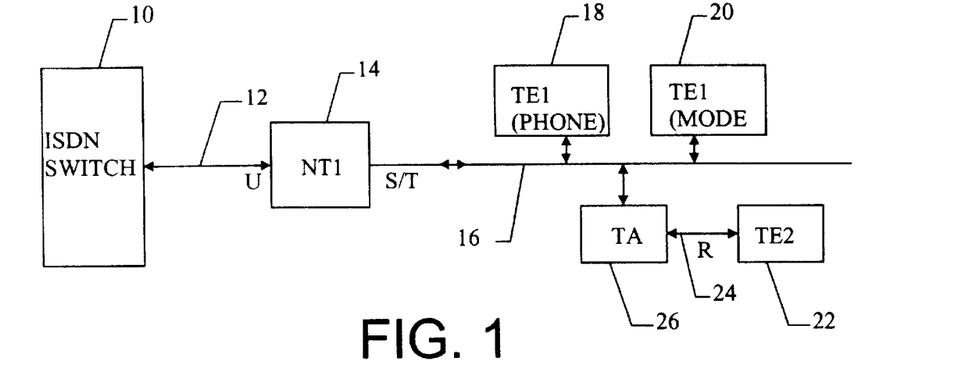
FIG. 1 depicts an ISDN communications network.

A typical ISDN configuration is shown in FIG. 1. The two-wire interface between the ISDN switch 10, and the customer premises is known as a "U" interface 12. An ISDN Network Terminator ("NT1") 14 converts this two-wire interface to a four wire "S/T" interface 16. The modulation format used between the central office and the NT1 is known as 2B1Q in North America, and 4B3T in Europe and Japan. The ISDN NT1 14 in turn demodulates the signal and passes the resulting digital information along the S/T bus 16 to a digital subscriber unit, also known as Terminal Equipment 1 (TE1) such as an ISDN phone 18, or alternatively, to an ISDN modem 20 for providing a communications link between computer devices.

There are many such ISDN modems commercially available which allow computers to connect to other computers or to networks of computers, via ISDN communication lines. Analog devices are designated as TE2, 22, and operate on what has been designated an R interface 24. To operate on the S/T bus 16, a TE2 analog device requires a terminal adapter (TA) 26. Typically, a TA might utilize a SLIC integrated circuit to provide the necessary interface functionality.

In the United States, customers are typically provided with a U interface by the service provider, and customers must provide and maintain their own NT1 termination for interconnecting devices designed for S/T interfaces. Of course, for convenience, an ISDN modem designed for use in the United States may also include the circuitry necessary for connection directly to an ISDN U interface. One disadvantage of a device having a built-in NT1 interface is that it might prevent other devices from being connected to the S/T bus if the device does not provide external access to the S/T bus.

It is well understood that analog subscriber units of the type described above will not function in an ISDN environment without appropriate TA interface circuitry. Indeed, devices exist that provide an analog interface for ISDN communications links. There are TA's that provide RJ-11 telephone connection plugs and RS-232 interfaces. The present invention provides an improved interface with numerous advantages over the prior art devices.

SUMMARY OF THE INVENTION

The present invention provides an improved SLIC interface that generates an audible ring-tone signal by way of an audio transducer or speaker without generating a high amplitude ring voltage signal. The present invention also provides added functionality to ISDN devices. Specifically, it provides an analog subscriber unit adapter/interface to facilitate the use of an analog subscriber unit over an ISDN communications link. The interface of the present invention is preferably provided as part of an ISDN modem, thereby giving added functionality to the modem by allowing analog phones to operate over an ISDN line. The interface operates by simulating the services and functions of an analog SLIC (Subscriber Line Interface Circuit) while converting and formatting the analog information to an ISDN compatible form, and vice versa. The SLIC simulator provides an audible ring-tone indicative of an incoming call by way of an audio speaker, thereby obviating the need for a high amplitude ring voltage signal to be sent to the subscriber unit. The need for a ring-trip circuit is therefore also obviated. The absence of a high amplitude ring voltage also permits circuit simplification and associated cost savings because the electrical isolation requirements recognized in the telecommunications industry are less strict for low-voltage circuits.

An object of the present invention is to provide a low voltage ring-tone signal to be emitted from a speaker or audio transducer.

Another object of the present invention is to provide an analog interface to an ISDN communications device to allow the use of analog subscriber equipment over an ISDN communications link.

Another object of the present invention is to provide added functionality to an ISDN modem by, inter alia, facilitating the use of analog subscriber devices over ISDN lines.

Still another object of the present invention is to provide the above analog interface functionality through the economical use of portions of the ISDN modem.

Yet another object of the invention is to circumvent the need for compliance with industry electrical isolation specifications which govern the isolation of the ring voltage power supply and the remaining circuitry.

Another object of the present invention is to provide SLIC functions in an efficient and inexpensive manner.

A further object of the present invention is to obviate the need for a high amplitude ring voltage signal by utilizing the modem audio speaker to generate the audible ring-tone signal.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE PREFERRED EMBODIMENT

Figure 2:
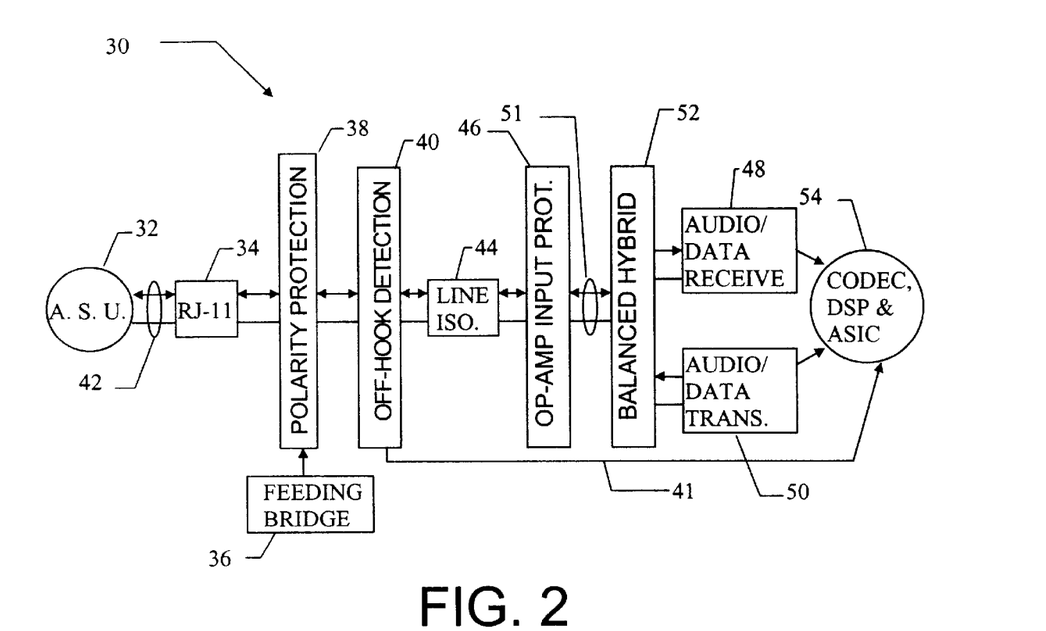
FIG. 2 shows a block diagram of a preferred embodiment of the SLIC simulator.

A block diagram of a preferred embodiment of the SLIC simulator 30 is shown in FIG. 2. The analog subscriber unit 32 connects to the SLIC simulator preferably via RJ-11 connector 34. Feeding Bridge 36 provides talking battery voltage through the polarity protection circuit 38. Off-Hook detection circuit 40 detects when the analog subscriber unit 32 generates an off-hook condition and provides an off-hook indicator signal on line 41 to the Digital Signal Processor (DSP) via the ASIC interface. The DSP, ASIC and Codec are shown as one functional block 54 for simplicity. An off-hook condition exists when subscriber unit 32 provides an electrical termination on the loop circuit 42. Line isolation is optional, and when necessary or desired, is provided by Line Isolation circuit 44. Op-amp Protection circuit 46 prevents the signals received from analog subscriber unit 32 from overdriving or damaging the operational amplifier within Audio/Data Receive circuit 48. Receive circuit 48 is a two-wire simplex circuit that receives the analog signals generated by the analog subscriber unit 32 and provides the signal to the codec for A/D conversion. Audio/Data Transmit circuit 50 is a two-wire simplex circuit that receives analog signals from the codec and transmits them towards the analog subscriber unit 32. The Balanced Hybrid circuit 52 interconnects the four-wire circuit comprising the two-wire Transmit and Receive circuits 48 and 50 to a two-wire duplex circuit 51. The Balanced Hybrid circuit functions to prevent signals from the transmit circuit 50 from being fed back into the receive circuit 48.

Figure 3:
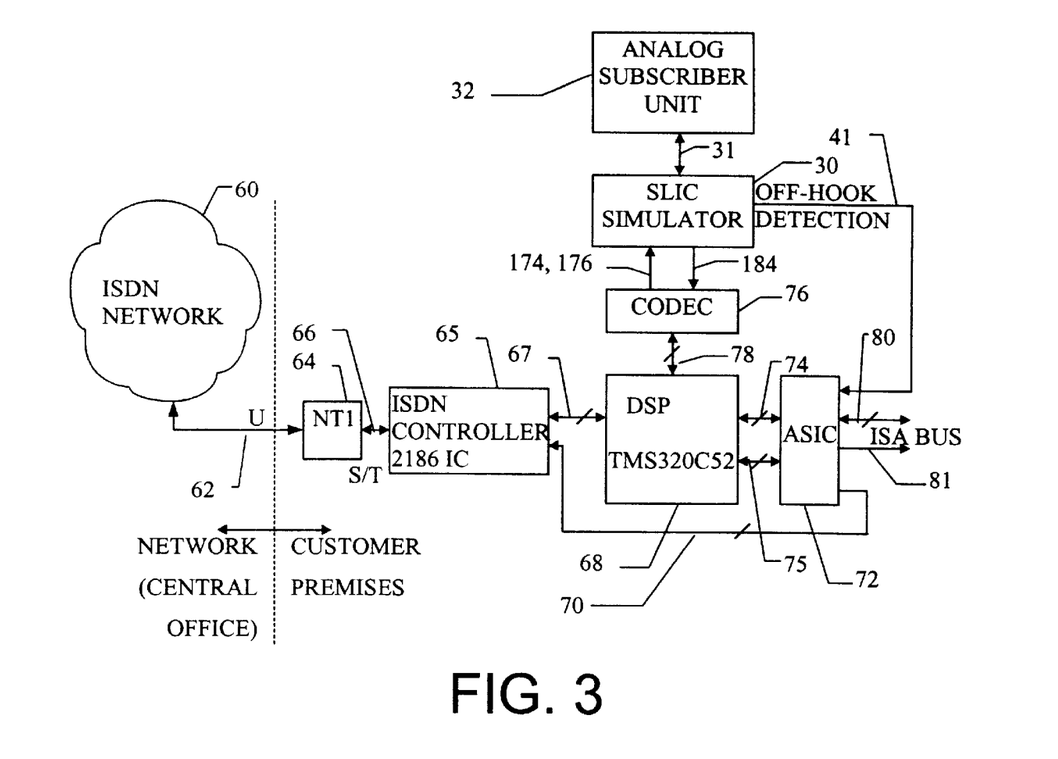
FIG. 3 shows a block diagram of the SLIC simulator within an ISDN modem.

FIG. 3 shows the SLIC simulator 30 situated in an ISDN communications system with an ISDN modem. The ISDN network 60 provides a U interface 62. The NT1 64 provides an S/T bus 66 to the ISDN Controller 65. The ISDN Controller 65 communicates with the DSP microprocessor 68 via bus 67. The ASIC interface 72 provides the ISDN Controller 65 with control information over bus 70. The DSP microprocessor 68 communicates with the ASIC 72 over data bus 74 and and address bus 75. The DSP 68 communicates with the Codec 76 over line 78. The DSP therefore acts as a data interface circuit between the ISDN controller circuit 65 and the codec 76. Line 78 is preferably a serial port connection, but may also be a parallel data bus, depending on the capabilities of the codec 76. Additionally, as can be appreciated by someone skilled in the art, the databuses 67 and 74 may be a common data bus.

ASIC 72 provides a pulse width modulated (PWM) signal output on line 81. This signal is generated by the DSP, and provided to the ASIC 72 via bus 74. The PWM signal on line 81 is used to generate a simulated audible ring-tone signal. The PWM signal is filtered, or shaped, to generate a signal consisting of discrete tones. The signal is then amplified and provided to an analog speaker when the ISDN modem wishes to indicate to the user that an analog phone call is incoming.

Figure 4:
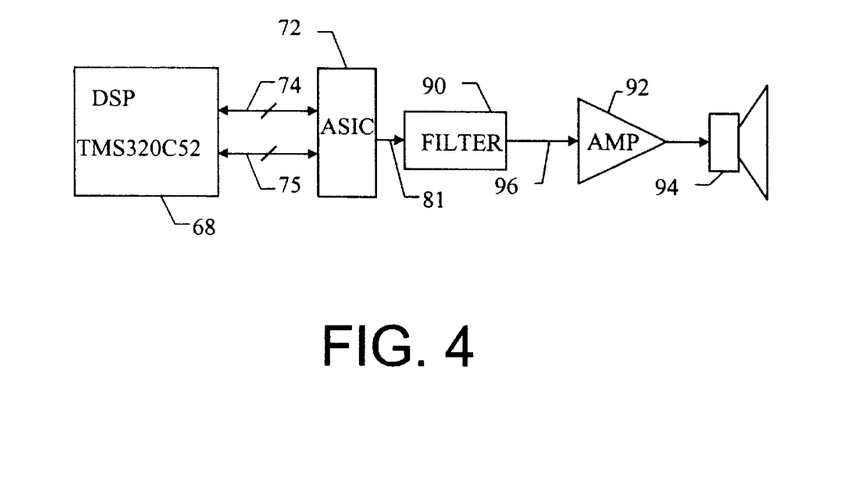
FIG. 4 shows a block diagram of the audible ring-tone circuit.

FIG. 4 shows the DSP 68, ASIC interface 72, analog filter 90, amplifier 92, and audio speaker 94. The PWM signal on line 81 is a 4 MHz pulse width modulated pulse train generated by the DSP 68 and passed through the interface ASIC 72. The signal is shaped by the analog filter 90 which preferably includes a series of three cascaded RC filters. Specifically, the filters are a low pass, a high pass and another low pass filter having cutoff frequencies of 159 Hz, 159 Hz, and 1592 Hz, respectively. Alternatively, the filter circuit 90 may be implemented with active devices such as operational amplifiers. After filtering, the ring-tone signal on line 96 preferably contains essentially two frequencies, 350 Hz and 450 Hz. The tones are applied to analog power amplifier 92. Amplifier 92 is preferably a simple operational amplifier such as an LM 386. The operational amplifier is preferably powered by a 5 volt power supply. The output of the amplifier 92 is a low voltage ring-tone signal (preferably no more than approximately 5 volts peak-to-peak) and drives an speaker 94 to produce the audible ring-tone signal. The ring-tone signal may be amplified to any appropriate analog voltage, but is preferably significantly lower than a typical ring voltage. Particularly, it is desirable that the ring-tone signal amplitude is lower than what the pertinent specifications define as a hazardous voltage, or low enough so as not to require additional isolation circuitry. Alternatively, a piezoelectric transducer may be used to provide the audible signal. The ring-tone signal may alternatively consist of unfiltered pulses, tones of alternating frequencies, or a signal which when emitted from an audio transducer, emulates a ringing sound. Still further, the transducer may alternatively provide a visual indication of an incoming call. A light emitting diode, for instance, may serve as a transducer to signal an incoming call.

The pulsing, or cadence, of the ring-tone signal to generate a periodic ring-tone signal is obtained by the DSP 68 periodically stopping the PWM signal on line 81. Alternatively, the microprocessor may continue to generate the PWM signal on line 81 and provide the pulsing by way of a mute input on the power amplifier 92. The mute signal would be applied periodically to result in a pulsed ring-tone signal. The microprocessor controls the mute input to power amplifier 92 by way of an input/output port, which is preferably routed through ASIC interface 72.

Generating the audible ring-tone signal in this manner, rather than by providing a ring voltage directly to the analog subscriber unit, has numerous advantages. First, the need for a high amplitude ring voltage is eliminated. This means that significant circuit simplifications may be made because the isolation specifications no longer apply to the device. For example, many SLIC circuits provide a ring relay signal that controls a relay (which provides isolation) that applies a high amplitude ring voltage signal on the subscriber loop. In the present invention, no relay is required. Additionally, because there are no high voltages within the circuit the need for an isolated secondary winding within the voltage transformer, as discussed above, is not required.

Indeed, if the SLIC simulator is situated within a PC, the voltage transformer may be omitted entirely. A traditional SLIC circuit situated within a personal computer requires a DC-to-DC converter to generate the high amplitude DC voltage used to generate the high amplitude ring voltage because a PC power supply typically provides a maximum voltage of ±12 volts. The transformer within such a voltage converter would likely require additional isolation. The SLIC simulator of the present invention when situated within a PC does not need a DC-to-DC converter to generate a high voltage.

Furthermore, a ring-trip detector is no longer necessary in the SLIC simulator. Of particular importance in traditional SLIC circuits is the rapid removal of the ring voltage to prevent the ring voltage from generating a loud sound in the subscriber's handset. A typical ring-trip circuit must detect variations in loop impedance (typically from about 5 or 10 K ohms to about 200 ohms) in the presence of a high amplitude ring voltage. Therefore, in a traditional analog loop serviced by a standard SLIC, off-hook detection in the presence of a ring voltage required a more sophisticated off-hook detection circuit, or a separate ring-trip circuit.

In the circuit of the present invention, an off-hook condition generated by the subscriber unit in response to an audible ring-tone from the speaker can be detected by the simple off-hook detection circuit 104. A sophisticated or specialize ring-trip detection circuit is no longer necessary because there is no ring voltage present on the subscriber loop to interfere with the off-hook detection circuit 104.

The codec 76 operates to convert digital samples to analog signals (D/A conversion) and to convert analog signals to digital samples (AID conversion). In the preferred embodiment, microprocessor 68 provides the codec 76 with necessary binary data from the ISDN B channel(s), to generate the voice frequency analog signal which is to be sent to the analog subscriber unit 32. Microprocessor 68 alternatively provides the data to the codec 76 via ASIC interface 72. The data on the B channel provided to the codec is the data which originated at the remote terminal. The DSP also sends data to the codec to generate call progress tones in response to ISDN signaling information.

The preferred codec is a standard codec that utilizes pulse code modulation (PCM), also known as $\mu$-law analog to digital (A/D) conversion in North America. (A slightly different format known as A-law is used in Europe and Japan). This type of A/D conversion is well known in the telecommunications art and is know to be based upon a logarithmic relationship between the PCM codewords and the analog voltages they represent. The logarithmic conversion function is approximated by linear segments of varying slope. The PCM codewords are 8 bits in length, where the most significant bit (MSB) represents the sign of the analog voltage. The next four bits represent the linear segment, and the last three bits represent the point on the specified linear segment. The standard sampling rate for a codec is known to be 8 KHz.

The codec 76 receives sequences of samples at an 8 KHz rate represented as PCM codewords from the microprocessor 68, and converts the codewords back to a corresponding time-varying analog voltage signal for transmission through the SLIC simulator 30 to the analog subscriber unit 32. The codec 76 may also be implemented using a standard A/D and D/A conversion which is based on a linear relationship between the codewords and the analog voltages, resulting in equally spaced quantization levels. Of course, the codecs of two communicating units should operate using the same conversion format.

The ASIC 72 communicates to a computer over bus 80. Because the preferred embodiment is an internal ISDN modem card for use in a personal computer (PC), bus 80 is preferably a standard ISA bus. The bus 80 may also be an Enhanced ISA (EISA) bus, a PCI bus, an RS-232 serial bus (well suited for devices intended for external connection to a PC), or any other suitable data link.

Figure 5A:
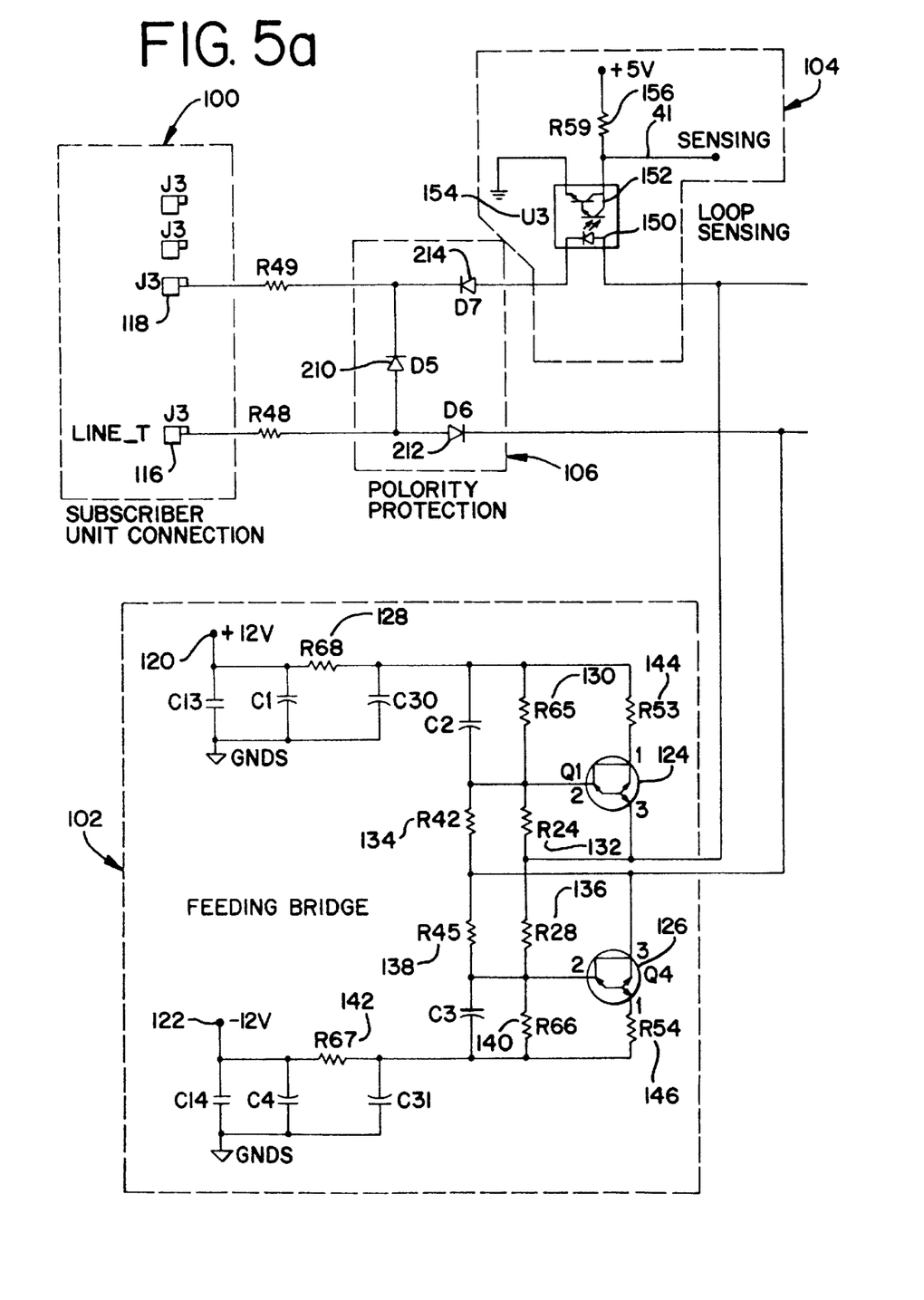
FIG. 5a shows a schematic representation of a portion of a preferred embodiment of the SLIC simulator.
Figure 5B:
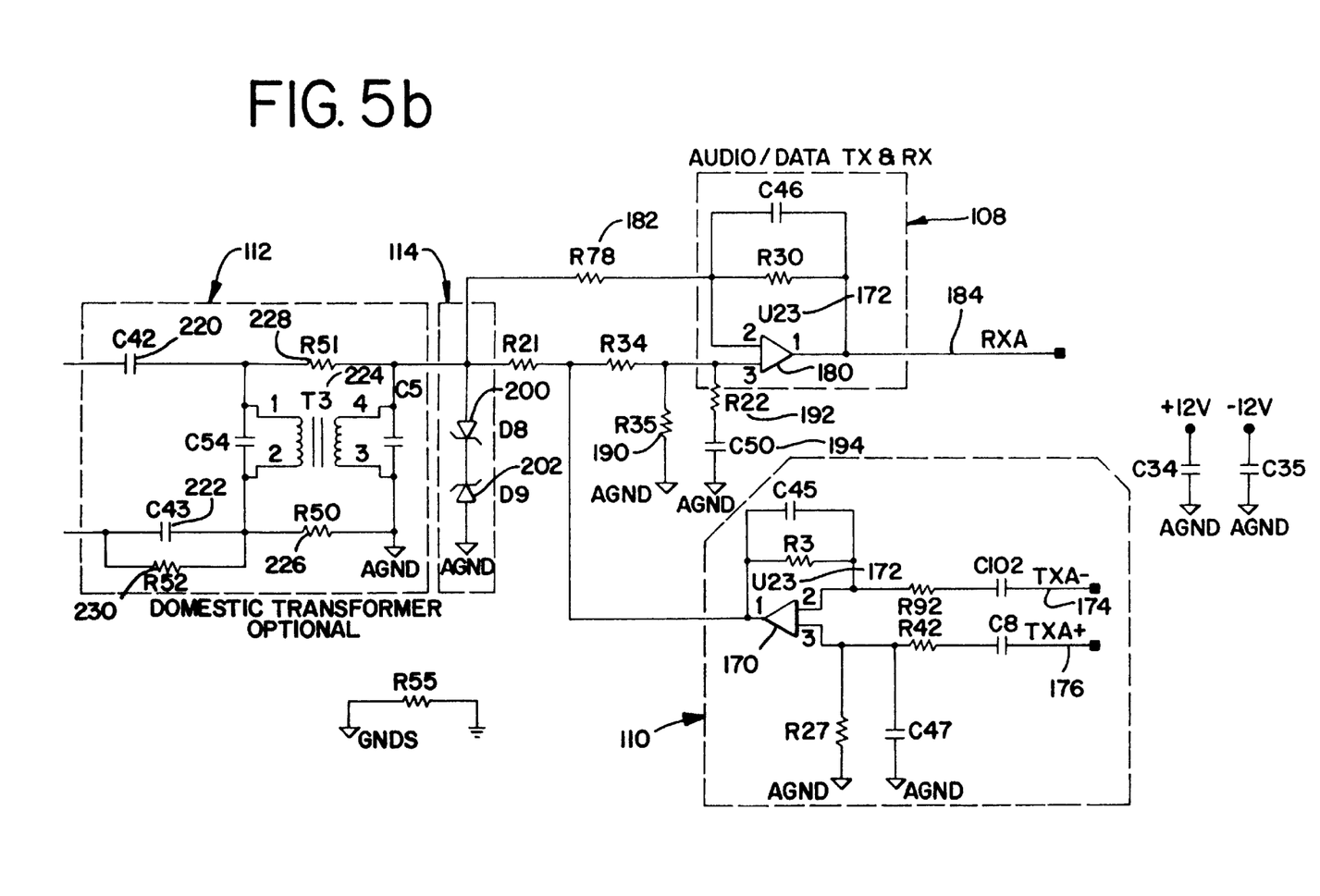
FIG. 5b shows a schematic representation of a portion of a preferred embodiment of the SLIC simulator.

The SLIC simulator, as shown in FIGS. 5a and 5b, includes a Subscriber Unit Connection 100, a Feeding Bridge 102, an Off Hook Sensor 104, and a Polarity Protection circuit 106. Audio/Data Receive circuit 108 and Audio/Data Transmit circuit 110 are interconnected in a balanced hybrid configuration. The SLIC simulator also preferably includes a Line Isolation circuit 112, and an Op-Amp Input Protection circuit 114. Power is preferably provided by the personal computer in which the ISDN modem is installed. The SLIC simulator also relies on portions of the ISDN modem to provide certain aspects of the interface, as detailed below.

The Feeding Bridge circuit 102 provides the talking battery voltage to the tip and ring conductors 116 and 118, respectively. Talking battery voltage is generated from the ±12 volts, 120 and 122, respectively, from the power supply of the computer and is supplied to the tip and ring conductors 116, 118 through the Darlington pair transistors 124 and 126. The transistors are biased on (in or near their linear region of operation) by the DC bias current through resistors 128, 130, 132, 134, 136, 138, 140 and 142. When the subscriber unit is on-hook, the loop across tip 116 and ring 118 is not terminated, or has a high impedance, and little or no current flows through the transistors 124 and 126 to the loop circuit. The Feeding Bridge 102 reaches an equilibrium point where nearly the full 24 volts is applied across the tip and ring conductors 116 and 118 to the analog subscriber unit.

When the analog subscriber unit goes off-hook, current flows through the transistors 124 and 126 and through resistors 128, 144, 146, and 142. The increased voltage drops across 128 and 142 caused by the loop current change the biasing of transistors 124 and 126 by way of resistors 130, 132, 134, 136, 138, and 140, causing the transistors to conduct less, thereby increasing the voltage drops across their emitter-collector terminals. The increased emitter-collector voltage drops serve to limit the voltage (and thus the current) supplied to the subscriber unit.

The Feeding Bridge 102 thus reaches a new equilibrium point dependent upon the resistive value of the loop termination. The net result is that the Feeding Bridge 102 limits the current provided to the subscriber unit, while maintaining a sufficient taking battery voltage on the tip and ring conductors 116 and 118. The Feeding Bridge 102 will also provide current limitation even in the event of a short circuit across the tip and ring conductors. This Feeding Bridge configuration 102 has been determined to provide sufficient power for termination resistive values within the expected range, and can maintain sufficient talking battery voltage at the subscriber unit, particularly when the wires 31 (FIG. 3) connecting the SLIC simulator to the analog subscriber unit is fairly short in length, thereby tending not to load the line significantly.

The Off-Hook Detector circuit 104 provides a sensing signal to the microprocessor 68 representative of the off-hook, or on-hook, condition of the analog subscriber unit. The sensing input 41 is preferably provided to the DSP microprocessor 68 through the interface ASIC 72, or alternatively by direct interrupt connection to the DSP microprocessor 68. The Off-Hook Detector circuit 104 includes the LED 150 and photosensitive Darlington transistor 152 on a single chip 154, pull-up resistor 156, and sense lead 41. When the analog subscriber unit is on-hook, no current is flowing through the conductors 116 and 118, and the Darlington transistor 152 is in the off state. The sense lead 41 is at a high voltage (+5 volts) due to the presence of pull-up resistor 156 connected to the +5 volt supply. When the analog subscriber unit generates a termination associated with an off-hook condition, current from the Feeding Bridge 102 begins to flow through the subscriber loop via tip and ring conductors 116 and 118. The current flowing through LED 150 causes the Darlington transistor 152 to conduct, which in turn causes a low voltage, near 0 volts, to be applied on the sense lead 41.

In the event the subscriber attempts to use a pulse dial subscriber unit, the off-hook detector may inadvertently generate an off-hook sensing signal. To prevent the functioning of the microprocessor from being diverted or interrupted, it can be programmed to ignore such inadvertent off-hook detection signals of a period corresponding to a pulse dial signal.

Audio/Data Transmit circuit 110 includes transmit op-amp 170 on U23 172, pins 5, 6, and 7, with differential inputs TXA– and TXA+ applied on lines 174 and 176, respectively. The differential input signals TXA– and TXA+ are supplied from the codec 76 shown in FIG. 3. The analog output of the Transmit circuit 110 is provided to the subscriber unit via the Balanced Hybrid circuit 52. The transmitted analog signals include the voice frequency information signal such as human speech or traditional modem signals, but also include call progress tones generated by the DSP in response to ISDN signaling information.

Audio/Data Receive circuit 108 operates to receive analog signals generated by the subscriber unit 32, and to pass the signals to the codec 76 for conversion to digital format for further transmission over the ISDN line. The Audio/Data Receive circuit 108 includes receive op-amp 180 on U23 172, pins 1, 2, and 3. The signal is received at inverting input of op-amp 180 through resistor 182. The op-amp 180 provides the analog signal to the codec 76 for quantization via line 184, and for subsequent transmission over the ISDN line.

Any signal transmitted from Transmit op-amp 170 will also be detected by the Receive op-amp 180 on the inverting input through resistor 182, thereby creating an echo signal. Thus, a two-wire to four-wire Balanced Hybrid circuit is used to provide echo cancellation. The signal from Transmit op-amp 170 is also applied to the noninverting input of receive op-amp 180. This is for the purpose of canceling the echo signal. For optimal cancellation, the resistor-capacitor network of 190, 192 and 194 is balanced to match (or to be proportional to) the line impedance of the subscriber loop.

Op-amp Protection circuit 114 functions to protect the operational amplifier from analog subscriber units that use pulse dialing techniques. Pulse dialing works by providing periodic short circuits between tip and ring conductors 116 and 118. If such a short circuit condition were periodically applied to the conductors 116 and 118 by the subscriber unit, the Feeding Bridge circuit would limit the talking battery voltage to a relatively low level (approximately 6 volts) during these pulses. The resulting AC voltage that would be applied to the input of the receive op-amp would be approximately 16 volts, which exceeds the input range of the op-amp 180. Note that the power rail inputs to op-amps 170 and 180 are ±12 volts. The two zener diodes 200 and 202 of Op-Amp Protection circuit 114 clamp the AC signal input to a maximum of approximately 6 volts. However, the zener diodes 200 and 202 still permit DTMF tones to pass through to the receive op-amp 180.

Polarity Protection circuit 106 includes diodes 210, 212, and 214. These diodes function to prevent any reverse polarity voltages that may be inadvertently applied by the analog subscriber unit 32 from propagating through the SLIC simulator 30 circuitry. For example, if a user accidentally connects the RJ-11 connector 34 to a standard central office subscriber loop, the tip 116 will be at approximately zero volts and the ring will be at approximately –48 volts. In such a situation, diode 210 conducts to prevent current flow into the Feeding Bridge circuit 102, thereby preventing damage to the Feeding Bridge 102. If in the event the polarity is reversed on the loop tip and ring 116 and 118, then the blocking Diodes 212 and 214 prevent current flow into the Feeding Bridge 102. It should be noted that the subscriber line interface circuit of the present invention does not require lightning protection on the subscriber loop because the subscriber is located nearby in-house.

Line isolation is provided by DC blocking capacitors 220 and 222. When desired, additional isolation is provided by transformer 224, but generally the isolation is not required because of relaxed isolation requirements due to the absence of a high amplitude ring voltage. Capacitor 222 and jumpers 226 and 228 are only in place when transformer 224 is not included in the circuit. Conversely, jumper 230 is present only when transformer isolation is used. This is because sufficient DC blocking is provided by capacitor 220 when transformer 224 is used.

The DSP microprocessor 68 provides a DTMF tone recognition function. The DSP microprocessor analyzes the voltage samples (incoming codewords from codec 76) for the presence of DTMF tones. Thus, when a subscriber unit provides dialing information via DTMF tones, the DSP is able to convert the dialing information to the appropriate ISDN signaling for call initiation. The DSP microprocessor also provides the codec 76 with the codewords necessary to generate the appropriate supervisory signals such as dial tone, ringback tone, and busy tone.

Various ISDN modem components, including the DSP microprocessor 68, ASIC interface 72, and ISDN controller 65, operate to provide appropriate B and D channel information to the ISDN network 60 and interpret incoming B and D channel information from the network 60 to thereby establish communications to the analog subscriber unit 32 in accordance with the pertinent ISDN industry specifications. As a result, the distant end subscriber unit need not have any special knowledge about the presence or capabilities of analog subscriber unit 32.

The detailed description of the preferred embodiment is intended as an illustration, and not as a limitation, of the present invention. Thus, while variations and modifications of the invention will occur to those skilled in the art, it is to be understood that such modifications are within the scope of the invention as defined by the following claims:

We claim:

1. An ISDN terminal adapter device comprising:

an ISDN interface for receiving first digital information signals and first digital control signals from an ISDN communications line;

a D/A converter connected to said ISDN interface for converting said first digital information signals into an analog information signal;

a subscriber line interface connected to said D/A converter to provide said analog information signal to a subscriber unit;

a ring-tone generator connected to said ISDN interface comprising a microprocessor that generates a pulse train signal and an analog filter to shape said pulse train signal thereby generating a low voltage ring-tone signal in response to said first digital control signals; and an audio transducer connected to said ring-tone generator for emitting an audible ring-tone signal to indicate the presence of an incoming call.

2. An ISDN terminal adapter device as claimed in claim 1 wherein said ISDN interface further comprises a call progress tone generator.

3. An ISDN terminal adapter device as claimed in claim 1 wherein said pulse train is a pulse width modulated signal.

4. An ISDN terminal adapter device as claimed in claim 1 wherein said low voltage ring-tone signal is no more than five volts peak to peak.

5. An ISDN terminal adapter device as claimed in claim 1 wherein said ISDN interface is a microprocessor.

6. An ISDN terminal adapter device as claimed in claim 1 further comprising an A/D converter connected to said ISDN interface and to said subscriber line interface for generating second digital information signals in response to analog signals from a subscriber unit.

7. An ISDN terminal adapter device as claimed in claim 6 wherein said ISDN interface further comprises a DTMF detector for analyzing said second digital information signals for the presence of DTMF signaling information.

8. An ISDN terminal adapter device as claimed in claim 7 wherein said ISDN interface provides second digital control signals to an ISDN communications line in response to said DTMF detector.

9. An ISDN terminal adapter device comprising:

a converter for converting analog subscriber signals to digital signals and digital signals to analog subscriber signals, said converter having a digital output and a digital input for sending and receiving digital signals, and an analog output and analog input for sending and receiving said analog subscriber signals;

a SLIC circuit connected to said converter analog output and said converter analog input for conveying said analog subscriber signals to and from a subscriber unit;

a controller for accepting receive data and receive control information from an ISDN subscriber line, and for providing transmit data to an ISDN subscriber line;

a data interface connected to said controller for receiving said receive data and said receive control information from said controller and for providing transmit data to said controller, said data interface also connected to said converter digital input and said converter digital output for providing said receive data to said converter and for accepting said transmit data from said converter;

a ring-tone generator comprising a microprocessor for generating a pulse train signal in response to said receive control information and a filter connected to said microprocessor for shaping said pulse train signal, and a power amplifier connected to said filter for outputting a low voltage ring-tone signal of no more than five volts peak to peak; and an audio transducer connected to said power amplifier for emitting an audible ring-tone signal in response to said low voltage ring-tone signal of no more than five volts peak to peak.

10. An ISDN terminal adapter device as claimed in claim 9 wherein said SLIC circuit further comprises:

an off-hook detector for generating a sensing signal when the subscriber unit is in an off-hook condition, and wherein said ring-tone generator is responsive to said sensing signal.

11. An ISDN terminal adapter device as claimed in claim 9 wherein said pulse train signal is a pulse width modulated signal.

12. An ISDN terminal adapter device as claimed in claim 9 wherein said data interface is a microprocessor.

13. An ISDN terminal adapter device as claimed in claim 9 further comprising a call progress tone generator.

14. An ISDN terminal adapter device as claimed in claim 13 wherein said call progress tone generator is a microprocessor.

15. An ISDN terminal adapter device as claimed in claim 12 further comprising wherein said microprocessor analyzes data from said converter to determine the presence of DTMF tones.

* * * * *